March 17, 1959     H. V. MALMSTADT     2,878,106
AUTOMATIC DIFFERENTIAL POTENTIOMETRIC TITRATOR
Filed June 8, 1955
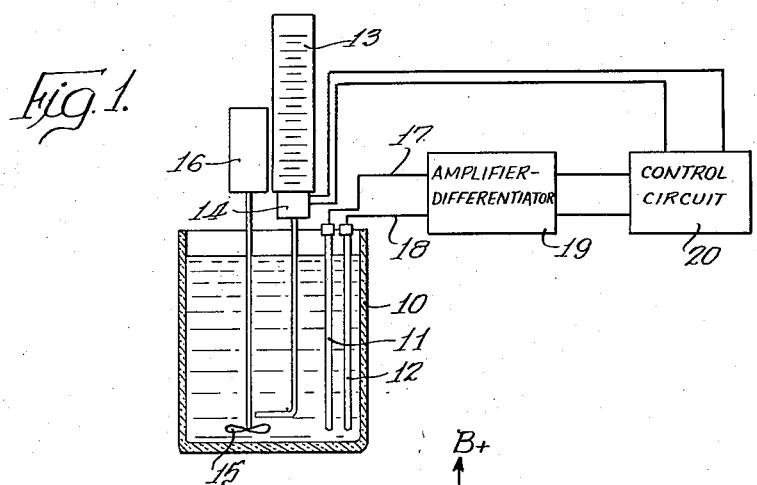
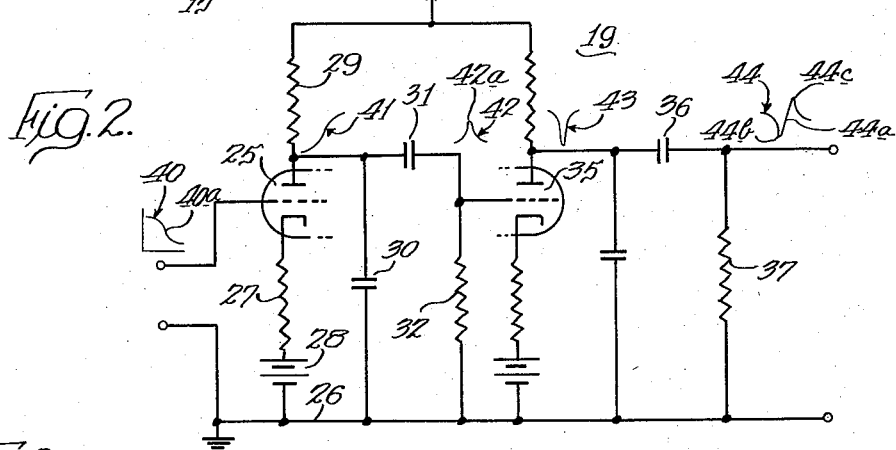
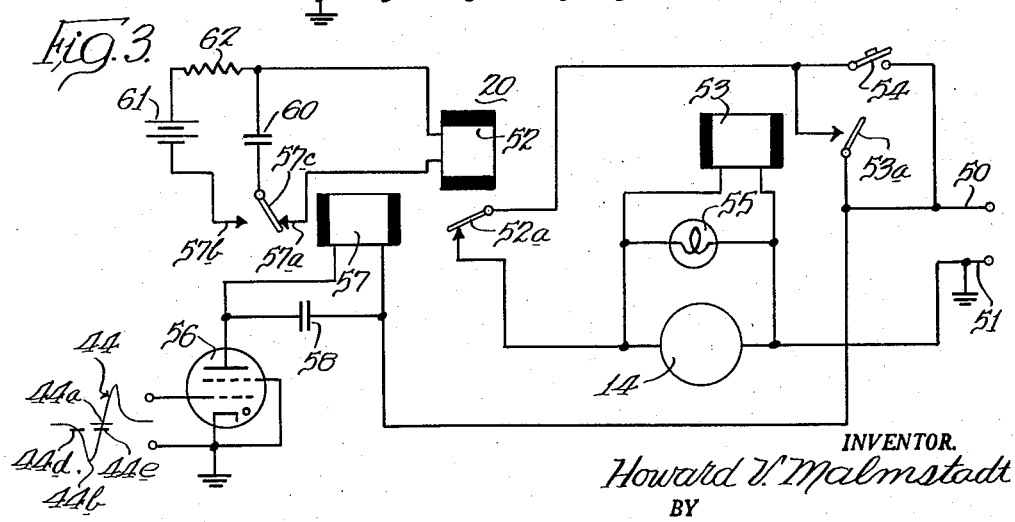
INVENTOR.
Howard V. Malmstadt
BY
Schroeder, Hofgren, Brady & Wegner
Attys.

2,878,106

AUTOMATIC DIFFERENTIAL POTENTIOMETRIC TITRATOR

Howard V. Malmstadt, Urbana, Ill., assignor to E. H. Sargent & Co., a corporation of Illinois Application June 8, 1955, Serial No. 513,930

6 Claims. (Cl. 23—253)

This invention is concerned with the titration of solutions and more particularly with a system for automatically determining the equivalence or end point of a titration.

The process of titration is used quite widely in conducting quantitative analyses to determine the strength or concentration of a solution. The process is conducted by reacting with a known quantity of a solution of unknown strength, a solution of known strength and determining the point at which the reaction is complete. The quantity of the added solution may then be utilized to calculate the strength of the unknown solution. If a pair of suitable electrodes are placed in the solution being titrated a voltage is generated between the electrodes which, when plotted as a function of the amount of titrant added, gives a generally S-shaped curve, known as the potentiometric curve for the titration. It has been found that the inflection point of the potentiometric curve corresponds with the equivalence or end point of the titration.

The general object of the present invention is to provide a novel and improved method and apparatus for determining the equivalence point of a titration from the potentiometric curve thereof.

Another object is to provide a method of controling the titration of a solution which comprises producing a signal which is a function of the potentiometric curve for the titration and utilizing the signal automatically to terminate the titration when the equivalence point is reached. A further object is to provide a method in which a derivative of the potentiometric curve is utilized to indicate the equivalence point of the titration.

Another object is to provide apparatus for controlling the titration of a solution, comprising electrodes in the solution for producing a first signal corresponding to the potentiometric curve of the titration, means connected to the electrodes for producing from the first signal a second signal corresponding to a derivative of the curve, and means responsive to the second signal for terminating the titration at the end point thereof.

Another object is to provide such an apparatus for controlling the titration of a solution, and including a circuit having a gas-filled, grid-controlled tube, triggered by the second derivative signal at the equivalence point of the titration, the tube having an anode circuit including a relay which is operative to effect terminating of the titration when the tube is triggered.

Another object is to provide apparatus for controlling the titration of a solution, comprising electrically operated means for controlling the addition of a titrant from the solution, means for deriving from the source an electrical signal which is a function of the second derivative of the potentiometric curve for the titration, a circuit for energizing the electrically operated means and having a normally open, manually operated switch and a normally closed relay operated switch in series therein, a first relay connected in parallel with the electrically operated means and having contacts associated therewith connected in parallel with the manually operated switch, whereby momentary closing of the manually operated switch energizes the electrically operated means and the first relay, completing a second energization circuit for the electrically operated means, a second relay for opening the relay operated switch, a circuit for energizing the second relay, including a capacitor, power source and double-throw switch, the capacitor being selectively connected to either said power source or the second relay through operation of the switch, a third relay controlling the operation of the double-throw switch, the switch connecting the capacitor to the power source when the third relay is not energized, and a grid-controlled tube, triggered by the signal at the equivalence point of the titration, the anode circuit for the tube including the third relay whereby the relay is energized at substantially the equivalence point of the titration connecting the capacitor to the second relay, opening the first mentioned switch and terminating the titration.

The objects of the invention generally set forth, together with other ancillary advantages, are attained by the construction and arrangement shown by way of illustration in the accompanying drawings, in which:

Figure 1 is a diagrammatic sketch of a titration set up utilizing the present invention;

Figure 2 is a schematic diagram of the differentiator circuit; and

Figure 3 is a schematic diagram of the relay control circuit.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

Turning now to Figure 1 of the drawings, a beaker 10 is shown into which is placed a known quantity of a solution of unknown strength. Also positioned within the beaker are a pair of electrodes 11 and 12 across which a varying voltage corresponding to the potentiometric curve of the titration is developed during the titration process. The titrant, a solution of known strength, is added to the beaker 10, preferably at a constant rate, from a graduated buret 13 through an electrically controlled device, as valve 14. The reaction between the two solutions is speeded by constantly stirring the contents of the beaker, as by a small paddle wheel 15 driven by motor 16. The voltage developed across electrodes 11 and 12 is coupled through leads 17 and 18 to an amplifier-differentiator circuit 19 (indicated in block form) and from there to a control circuit 20 (also in block form) which in turn controls the operation of valve 14. The electrical signal derived from the electrodes is utilized, as will appear, to close valve 14 stopping the flow of titrant at substantially the equivalence point of the titration. The quantity of titrant added may then be noted from the buret graduations.

Turning now to Figure 2, the amplifier-differentiator circuit 19 will be described. While one specific circuit is shown herein and values will be given for the components thereof, it is to be understood that the circuit is intended to be representative only and that the details thereof as to component values and tube types are not critical, unless specifically stated to the contrary. Many changes and modifications will readily be apparent to those skilled in the art.

The signal developed between electrodes 11 and 12, which represents the potentiometric curve for the titration, is coupled to the input of amplifier 25, one-half of a 6SL7 dual triode. The cathode of amplifier 25 is connected to a common terminal or ground 26 through an unbypassed bias resistor 27, 2,000 ohms and a further bias supply, battery 28, 1.5 volts. The plate circuit of the amplifier is completed through load resistor 29, 1 megohm, to a B+ supply of 270 volts (not shown). Capacitor 30, .02 $\mu$f. (microfarad) by-passes the plate load resistor to ground. The output of amplifier 25, which is developed across resistor 29, is connected to a differentiator circuit made up of capacitor 31, .5 $\mu$f. and resistor 32, 1 megohm. Thus the first derivative of the input signal appears across resistor 32, from which it is coupled to the input of a second amplifier 35, one-half of a 6SL7. The circuit of amplifier 35 is identical with that of amplifier 25 and will not be described in detail. The output of amplifier 35 is coupled to a second differentiator circuit made up of a capacitor 36, .5 $\mu$f., and resistor 37, 1 megohm. The output of the second amplifier-differentiator circuit is developed across resistor 37 and represents the second derivative of the potentiometric curve for the titration.

As shown in Figure 2, the input signal 40 to the amplifier-differentiator 19, a plot of the voltage developed across electrodes 11 and 12 as a function of the quantity of titrant added to the solution (or as a function of time where the titrant is added at a constant rate) is an inverted S-shaped curve. As mentioned briefly above, the inflection point 40a of the curve has been found to be the equivalence or end point of the titration, and it is at this point that it is desired to end the addition of titrant to the solution.

The direction of voltage change in the curve, that is whether the voltage increases or decreases with the addition of the titrant, depends on which of the electrodes 11 or 12 is utilized as the reference electrode; and the connections shown herein with the potentiometric curve 40 as shown, were adopted to provide a signal of the proper polarity for use with control circuit 20. Obviously the polarity of the signal could be reversed either by changing the connections of the electrodes or by adding another stage of amplification.

Signal 40 appears at the plate of amplifier 25 in amplified form as shown at 41. The first derivative of signal 40 has a form indicated at 42 in which the peak 42a corresponds with the inflection point 40a of the potentiometric curve. This signal is again amplified and appears in amplified and inverted form at the plate of tube 35, as indicated at 43. The second derivative of the potentiometric curve, which appears across resistor 37, is shown at 44, and comprises first a negative peak 44b followed by a positive peak 44c. The mid-point 44a of the curve, intermediate the negative and positive peaks, corresponds to the inflection point 40a of the original curve and is the point at which the titration should be terminated.

The various wave forms shown in Figures 2 and 3 show the complete potentiometric curve and its derivatives as they would appear if titrant was added to the solution for some time after the end point of the titration is reached. In practice, with the control circuit to be described, the addition of titrant is stopped at the end point of the process. However, the full curves have been shown in order to provide a better understanding of the operation of the invention.

The control circuit 20 in Figure 3 not only provides a means for utilizing the second derivative of the potentiometric curve to terminate the titration at the end point thereof, but also provides a simple means for starting the titration operation. Power input terminals 50 and 51 of the control circuit are connected to a suitable source of power, as 110 volt, 60 cycle alternating current. The electrically operated titrant valve 14 is connected across the line in series with normally closed contact 52a, associated with a relay 52, and normally open contact 53a associated with relay 53. Connected in parallel with contact 53a is start switch 54, which may be a momentarily actuated push-button. Relay 53 is connected in parallel with titrant valve 14 and when switch 54 is closed, both titrant valve 14 and relay 53 are energized, starting the flow of titrant and closing contact 53a. Switch 54 may then be released and the circuit for titrant valve 14 and relay 53 is completed through contact 53a. A lamp 55 is also connected in parallel with titrant valve 14, providing a ready visual indication when the titrator is in operation.

The second derivative of the potentiometric curve for the titration, developed across resistor 37, is connected to the control grid of a grid-controlled gas tube 56, a 2D21. The plate of control tube 56 is connected through relay 57 to one side of the 110 volt line, while the cathode is returned to the other side of the line. Relay 57 has associated therewith a single pole, double-throw switch having stationary contacts 57a and 57b and movable arm 57c. The control grid of tube 56 has applied thereto a voltage which is either zero or slightly positive during the initial portion of the titration. Since the plate of the tube is connected to an alternating supply, the tube will conduct over substantially the entire positive half cycle, energizing relay 57 during this time. Capacitor 58, 8 $\mu$f., is connected in parallel with relay 57 and serves to keep relay 57 energized during the period when tube 56 is not conducting. Thus, during the initial portion of the titration operation, movable arm 57c of the relay will be closed with contact 57a connecting capacitor 60, 500 $\mu$f., to relay 52. As the titration nears the end point, the singal applied to the control grid of tube 56 becomes negative and at about the point 44d the tube will cease to fire during positive half cycles of the power voltage. (It will be understood, of course, that the control grid loses control of the gas tube once it has fired and the plate current must be interrupted and the tube permitted to deionize before the grid regains control.) This deenergizes relay 57 permitting movable arm 57c of the relay to engage contact 57b, connecting capacitor 60 to a source of voltage, as 10 volt battery 61 from which the capacitor is charged. Then as the signal 44 again approaches zero, the end point of the titration, control tube 56 will fire, energizing relay 57 and connecting charged capacitor 60 to relay 52. The capacitor discharges through the relay energizing it and opening contact 52a. This breaks the energization circuit for both the titrant valve 14 and holding relay 53, permitting contact 53a to open and terminating the titration. While control tube 56 may fire at a point 44e on signal 44, with a negative voltage of one or two volts on the grid, and slightly before the inflection point 40a of curve 40, the mechanical inertia of the system delays the actual closing of valve 14 so that it occurs at very near the true equivalence point of the titration. Any remaining error has been found to be negligible.

The amount of titrant which has been used may then be noted and this indication, together with the original volume of the sample and the strength of the titrant, which are known, may be used to calculate the concentration of the unknown solution.

In order to prevent the titrant operation from being terminated at an intermediate point by noise voltages or other false signals which might block control tube 56, a resistor 62, 2,000 ohms, is connected in the charging circuit of capacitor 60. Thus, relay 57 must be deenergized for an appreciable time in order to charge capacitor 60 to a voltage sufficient to energize relay 52.

I claim:

1. Apparatus for use in titrating a solution, comprising: electrodes in said solution for producing a first signal corresponding to the potentiometric curve of said titration; a first amplifying stage connected to said electrodes for amplifying said signal and having connected thereto first resistance-capacitance circuits for developing the first derivative of said signal; second resistance-capacitance circuits connected to said first circuits for developing a signal corresponding to the second derivative of said first signal; and means responsive to said second derivative signal for indicating the equivalence point of said titration.

2. Apparatus for controlling the titration of a solution, comprising: electrically operated means for controlling the addition of a titrant to said solution; means for deriving from said solution an electrical signal which is a function of the second derivation of the potentiometric curve for said titration; a normally closed circuit for energizing said electrically operated means and having a switch therein; a relay for opening said switch; a circuit for energizing said relay, including a capacitor, a power source and a double-throw switch, said capacitor being selectively connected to either said power source or said relay through operation of said double throw switch; a second relay controlling operation of said double-throw switch, said double throw switch connecting the capacitor to the power source when the relay is not energized; a gas-filled, grid-controlled tube, triggered by said signal at the equivalence point of said titration, the anode circuit for said tube including said last mentioned relay whereby said relay is energized at substantially the equivalence point of the titration, connecting said charged capacitor to said first mentioned relay, opening the first mentioned switch and terminating the titration.

3. Apparatus of the character described in claim 2, wherein there is a resistance in series with said capacitor and power source.

4. Apparatus for controlling the titration of a solution, comprising: electrically operated means for controlling the addition of a titrant to said solution; means for deriving from said solution an electrical signal which is a function of the second derivative of the potentiometric curve for said titration; a normally closed circuit for energizing said electrically operated means and having a switch therein; a relay for opening said switch; a circuit for energizing said relay, including a capacitor, a power source and a double-throw switch, said capacitor being selectively connected either to said power source or to said relay through operation of said double throw switch; a second relay controlling operation of said double-throw switch, said double throw switch connecting the capacitor to the power source when the relay is not energized; a gas-filled, grid-controlled tube, triggered by said signal at the equivalence point of said titration; and an anode circuit for said tube including said last mentionned relay and an alternating power source, whereby the relay is energized at substantially the equivalence point of the titration, connecting the charged capacitor to the first mentioned relay, opening the first mentioned switch and terminating the titration.

5. Apparatus of the character described in claim 4, wherein there is a capacitor in shunt with said last mentioned relay.

6. Apparatus for controlling the titration of a solution, comprising: electrically operated means for controlling the addition of a titrant to said solution; means for deriving from said solution an electrical signal which is a function of the second derivative of the potentiometric curve of said titration; a circuit for energizing said electrically operated means and having a normally open, manually operated switch and a normally closed, relay operated switch in series therein; a first relay connected in parallel with said electrically operated means and having contacts associated therewith connected in parallel with said manually operated switch, whereby momentary closing of said manually operated switch energizes the electrically operated means and said first relay, completing a secondary energization circuit for said electrically operated means; a second relay for opening said relay operated switch; a circuit for energizing said second relay, including a capacitor, a power source and a double-throw switch, said capacitor being selectively connected to either said power source or said second relay through operation of said double throw switch; a third relay controlling operation of said double-throw switch, said double throw switch connecting the capacitor to the power source when the third relay is not energized; a grid-controlled tube, triggered by said signal at the equivalence point of said titration, the anode circuit for said tube including said third relay whereby said relay is energized at substantially the equivalence point of the titration, connecting said charged capacitor to said second relay, opening said normally closed relay operated switch and terminating the titration.

References Cited in the file of this patent
UNITED STATES PATENTS

| | | |
|---|---|---|
| 1,684,645 | Smith et al. | Sept. 18, 1928 |
| 2,621,673 | Hodgens | Dec. 16, 1952 |

FOREIGN PATENTS

| | | |
|---|---|---|
| 68,815 | Denmark | Mar. 28, 1949 |